(12) United States Patent
Choi et al.

(10) Patent No.: US 9,749,930 B2
(45) Date of Patent: Aug. 29, 2017

(54) METHOD FOR DELIVERING OPTIMUM PATH INCLUDING PLURALITY OF PASSAGE PLACES AND APPARATUS THEREFOR

(71) Applicant: LG Electronics Inc., Seoul (KR)

(72) Inventors: Jaehyuk Choi, Seoul (KR); Hongbeom Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 122 days.

(21) Appl. No.: 14/782,399

(22) PCT Filed: Apr. 10, 2014

(86) PCT No.: PCT/KR2014/003105
§ 371 (c)(1),
(2) Date: Oct. 5, 2015

(87) PCT Pub. No.: WO2014/168428
PCT Pub. Date: Oct. 16, 2014

(65) Prior Publication Data
US 2016/0044571 A1  Feb. 11, 2016

Related U.S. Application Data

(60) Provisional application No. 61/810,733, filed on Apr. 11, 2013, provisional application No. 61/825,524, (Continued)

(51) Int. Cl.
*H04W 40/04* (2009.01)
*G08G 1/0968* (2006.01)
(Continued)

(52) U.S. Cl.
CPC ...... *H04W 40/04* (2013.01); *G08G 1/0968I1* (2013.01); *G08G 1/096838* (2013.01);
(Continued)

(58) Field of Classification Search
None
See application file for complete search history.

(56) References Cited

U.S. PATENT DOCUMENTS 9,002,632 B1 * 4/2015 Emigh .................. G06Q 30/02
340/995.19
2007/0129886 A1 * 6/2007 Toms ................. G01C 21/3691
701/414

(Continued)

FOREIGN PATENT DOCUMENTS

CN  1942740 A  4/2007
CN  101142463 A  3/2008
(Continued)

*Primary Examiner* — Min Jung
(74) *Attorney, Agent, or Firm* — Dentons US LLP

(57) ABSTRACT

A method for receiving a trip path including a plurality of passage places calculated by a server according to an embodiment of the present invention includes the steps of: enabling a terminal to send a request for a trip path including a plurality of passage places to the server, the request containing an indicator for representing the request for the path including the plurality of passage places from the server, wherein if the proposed trip path consists of a plurality of sub-paths, and thus the information of a proposed trip path contains the information indicating the sub-paths of the first sub-path is received through the link for the first sub-path, and the information of the first sub-path may include an indicator indicating whether there exists a second sub-path subsequent to the first sub-path, and a link for the second sub-path.

18 Claims, 7 Drawing Sheets

Related U.S. Application Data filed on May 21, 2013, provisional application No. 61/827,668, filed on May 27, 2013, provisional application No. 61/897,816, filed on Oct. 30, 2013, provisional application No. 61/902,272, filed on Nov. 10, 2013, provisional application No. 61/941,469, filed on Feb. 18, 2014, provisional application No. 61/969,249, filed on Mar. 23, 2014.

(51) Int. Cl.
*H04L 12/28* (2006.01)
*H04W 8/08* (2009.01)
*H04W 40/38* (2009.01)

(52) U.S. Cl.
CPC ............ *H04L 12/28* (2013.01); *H04W 8/085* (2013.01); *H04W 40/38* (2013.01)

(56) References Cited

U.S. PATENT DOCUMENTS

| | | | | |
|---|---|---|---|---|
| 2008/0234927 | A1* | 9/2008 | O'Neill | G08G 1/096811 701/465 |
| 2010/0036606 | A1* | 2/2010 | Jones | G01C 21/3446 701/533 |
| 2012/0215441 | A1* | 8/2012 | Hayakawa | G01C 21/367 701/428 |
| 2013/0261966 | A1* | 10/2013 | Wang | G01C 21/3469 701/533 |

FOREIGN PATENT DOCUMENTS

| | | |
|---|---|---|
| CN | 101900570 A | 12/2010 |
| CN | 102713993 A | 10/2012 |
| JP | 2001148092 A | 5/2001 |
| JP | 2003194561 A | 7/2003 |
| JP | 2007225504 A | 9/2007 |
| JP | 2011069827 A | 4/2011 |
| JP | 4742908 B2 | 8/2011 |
| JP | 2011242363 | 12/2011 |
| JP | 2012242370 | 12/2012 |
| KR | 1020060064711 | 6/2006 |
| KR | 1020070099727 | 10/2007 |
| KR | 1020080096274 | 10/2008 |
| WO | 2011089639 A1 | 7/2011 |

\* cited by examiner (a)

(b)

(c)

METHOD FOR DELIVERING OPTIMUM PATH INCLUDING PLURALITY OF PASSAGE PLACES AND APPARATUS THEREFOR

This application is a 35 USC §371 National Stage entry of International Application No. PCT/KR2014/003105 filed on Apr. 10, 2014, and claims priority to U.S. Provisional Application Nos. 61/810,733 filed on Apr. 11, 2013; 61/825,524 filed on May 21, 2013; 61/827,668 filed on May 27, 2013; 61/897,816 filed on Oct. 30, 2013; 61/902,272 filed on Nov. 10, 2013; 61/941,469 filed on Feb. 18, 2014 and 61/969,249 filed on Mar. 23, 2014, all of which are hereby incorporated by reference in their entireties as if fully set forth herein.

TECHNICAL FIELD

The present invention relates to a method and apparatus for transmitting a path (or route), and more particularly to a method and apparatus for transmitting a path (or route) including a plurality of waypoints (i.e., passage places).

BACKGROUND ART

Conventionally, a navigation terminal detects its current location, that is, an origin of a trip through a Global Positioning System (GPS) connection, receives information about a destination of the trip from a user, and internally calculates a route based on the origin and the destination. Along with the recent proliferation and increased performance of smartphones, services have become popular, in which a traffic and route information providing server provides route information, real-time traffic information related to routes, and other various information to Personal Navigation Devices (PNDs) over a mobile communication network.

Particularly in the situation where various navigation services are available, the Open Mobile Alliance (OMA) standardization organization is working on standardization of Dynamic Navigation Enabler (DynNav) that provides real-time traffic information by Peer to Peer (P2P) communication through an Internet Protocol (IP)-based network of a mobile communication network or a wireless network, rather than Traffic Protocol Expert Group (TPEG) information is transmitted over a Digital Multimedia Broadcasting (DMB) network that provides information in a broadcast signal. The standard considers a navigation terminal and a service type largely in two ways for a smartphone.

First, a traffic and route information providing server performs complex route computation, instead of a navigation application loaded in a smartphone, and indicates a calculated route to the smartphone. Second, owing to the improved performance of a smartphone, an application loaded in the smartphone performs or a navigation terminal equipped with a mobile communication modem performs route computation. In this case, the traffic and route information providing server does not provide route information. Rather, once the terminal registers a calculated route to the server, the terminal can receive from the server only real-time traffic information related to the registered route in a customized manner by IP-based P2P communication, not in a conventional broadcast signal.

FIG. 1 illustrates Navigation Device (ND) types. NDs may be classified into a type 110 that additionally provides TPEG-based traffic information transmitted through a broadcasting network such as a DMB network, a type 120 that additionally provides traffic information in an IP-based manner, for example, over a mobile communication network or a Wireless Fidelity (Wi-Fi) network, and a standalone type 130 that tracks the location of a vehicle through a GPS connection without connecting to other communication media, generates route information, and provides the route information.

DynNav under standardization in the OMA LOC WG belongs to the type 120 that provides IP-based traffic information, specifically by P2P communication. The following two types of NDs are defined in DynNay.

1. Smart ND: a device that can calculate a route on its own and thus requests only real-time traffic information to a DynNav server without receiving route information from the DynNav server.

2. Lightweight ND: a device that cannot calculate a route on its own and thus requests all real-time traffic information including route information to a DynNav server.

Since traffic information is requested and provided in a RESTful-based manner in a conventional DynNav system, the following route information formats are used and each information format can be defined by XML Schema Definition (XSD).

1) Trip Structure: a terminal initially acquires basic information such as an origin and a destination from a user, for route setting, and provides the acquired information to a server. The trip structure includes subsets corresponding to a plurality of route structures.

TABLE 1

| Element | Type | Optional | Description |
| --- | --- | --- | --- |
| originWGS84 | Location_Point | Choice | Location_Point structure is defined in tpeg-locML [TTI LOC]. At least one element originWGS84 or originAddress MUST be specified when Trip resource is created. This element is mandatory when the Trip resource is read by the client. This field can be used to indicate the assumed current position of the client, enabling route information updating procedure on the server. |
| originAddress | Civic Location Format | Choice | Civic Location Format is defined by IETF [RFC 5139]. At least one element originWGS84 or originAddress MUST be specified. |
| destinationWGS84 | Location_Point | Choice | Location Point structure is defined in tpeg-locML [TTI LOC]. At least one element destinationWGS84 or destinationAddress or destionation3rdParty MUST be specified when Trip resource is created. This structure is mandatory when the Trip resource is read by he client. |

TABLE 1-continued

| Element | Type | Optional | Description |
|---|---|---|---|
| destinationAddress | Civic Address | Choice | Civic Location Format is defined by IETF [RFC 5139]. At least one element destinationWGS84 or destinationAddress or destination3rdParty MUST be specified when Trip resource is created. This structure may be provided by the server in case the user defines a destination using destinationWGS84 or destionation3rdParty structures. |
| destination3rdParty | xsd:string | Choice | One element among destinationWGS84, destinationAddress, or destionation3rdParty MUST be specified when Trip resource is created. |
| thirdPartyIDType | ThirdPartyIDType-List | Yes | Inditae which type of the thirdparty ID is used in origin3rdParty or destination3rdParty. If destination3rdParty exists, thirdPartyIDType shoud exist. |
| waypoints | Location_Point [0 . . . unbounded] | Yes | Location_Point structure is defined in tpeg-locML |
| startingTime | xsd:dateTime | Yes | Starting time of the planned trip. If not present, current time is assumed. |
| tollRoad | xsd:boolean | Yes | If true or not present, toll road are allowed.) |
| vehicleType | Vehicle_Info | Yes | Vehicle_Info structure is defined in tpeg-rtmML |
| calculateRoute | xsd:boolean | Yes | If false or not present, server should not propose routes. |
| requestedEventsCategories | xsd:string [0 . . . unbounded] | yes | Categories of traffic information, related to the defined Trip, requested by the application. This field shall be encoded according to the list of values defined in the rtm00 table available in TTI RTM. If this field is not present, the server MUST provide traffic information for all defined categories (including network performance parameters). |
| link | common:Link [0 . . . unbounded] | Yes | Links to routes related to the trip. Attribute "rel" must be set to "Route". |
| resourceURL | xsd:anyURI | Yes | Self-referring URL. SHALL NOT be included in POST requests, MUST be included in responses to any HTTP method that returns an entity body, and in PUT requests.) |

2) Route Structure: a route structure is expressed as a plurality of segments as a way to represent total routes calculated using the trip structure.

TABLE 2

| Element | Type | Optional | Description |
|---|---|---|---|
| travellingTime | xsd:float | Yes | Total travelling time (in minutes) for the route |
| distance | xsd:float | Yes | Total distance (in Km) of the route |
| origin | Location_Point | No | Location_Point structure is defined in tpeg-locML [TTI LOC]. |
| partialRouteInformation | xsd:boolean | Yes | If set to true, the Route is described with partial information: only changed segments sequence is provided with respect to a reference route. The reference route is defined in link field of this structure. The partial encoding schema MAY be used for full routes resources. If this field is absent or set to false, the route information is complete. |
| firstSegment | xsd:integer [0 . . . unbounded] | Yes | This field represents one or more index of the first segment in the reference route segments sequence to be replaced by partial route segments sequence. In a partial route, a sequence of deviations MAY be provided with respect to the reference route: for each deviation it is provided the index of the first segment in the reference route that has to be replaced by partial route segments sequence. This field is present only in case of partial route encoding schema (partialRouteInformation set to True) |

TABLE 2-continued

| Element | Type | Optional | Description |
|---|---|---|---|
| lastSegment | xsd:integer [0 . . . unbounded] | Yes | This field represents one or more index of the last segment in the reference route segments sequence to be replaced by the segments sequence of partial route. Only used for the partial route case.<br>In a partial route, a sequence of deviations MAY be provided with respect to the reference route: for each deviation it is provided the index of the last segment in the reference route that has to be replaced by partial route segments sequence.<br>This field is present only in case of partial route encoding schema (partialRouteInformation set to True). |
| numSegments | xsd:integer [0 . . . unbounded] | Yes | This field represents the number of segments that constitutes each single deviation of the partial route. Only used for the partial route information case.<br>In a partial route, a sequence of deviations MAY be provided with respect to the reference route: for each single deviation the number of describing segments is provided. The sum of the number of segment of each deviation should be equal to the number of segments provided in the partial route.<br>This field is present only in case of partial route encoding schema (partialRouteInformation set to True). |
| trafficEvents | CategorizedEvent-ListReference [0 . . . unbounded] | Yes | List of traffic events as defined in tpeg-rtmML [TTI RTM], grouped into categories. |
| link | common:Link [0 . . . 2] | Yes | Link to reference route resource. Two reference route resources are present.<br>1) (Reference to the route for which it is proposed as alternative. Attribute "rel" must be set to "Route".)<br>2) Reference to the route for which the partial route information is referred. Attribute "rel" must be set to "ReferenceRoute". |
| resourceURL | xsd:anyURI | Yes | Self-referring URL. SHALL NOT be included in POST requests, MUST be included in responses to any HTTP method that returns an entity body, and in PUT requests. |

3) Segment Structure: it is a structure that represents each segment. The segment structure may define a real-time traffic state corresponding to the segment as well as the length of the segment, in TPEG.

TABLE 3

| Element | Type | Optional | Description |
|---|---|---|---|
| originPoint | Location_Point | Yes | This field represents the origin of the segment encoded according to Location_Point structure as defined in tpeg-locML.<br>In case segment structure is used for describing a route and this field is not present, the starting point of the segment should be assumed equal to the ending point of the previous segment, or the trip origin in case of the first segment of the route. In case of partial route, the origin of the first segment of each deviation is the ending point of the last valid segment in reference route. |
| endPoint | Location_Point | No | Location_Point structure as defined in tpeg-locML [TTI LOC]. The starting point of the segment should be assumed equal to the ending point of the previous segment (or the trip origin for the first segment)) |
| midwayPoint | Location_Point [0 . . . unbounded] | Yes | Location_Point structure as defined in tpeg-locML [TTI LOC] |

TABLE 3-continued

| Element | Type | Optional | Description |
|---|---|---|---|
| polyLine | xsd:string | Yes | Polyline is used to describe the shape of a segment. This field is a string that contains a sequence of geographic points expressed in WGS84 coordinates. Each single point is encoded as a sequence of WGS84 Latitude, Blank (character), WGS84 Longitude, Colon (character), Blank (character). The shape of segments is provided by the server if explicitly requested by the application. The level of polyline resolution is defined by the DynNav Server. When used in full route resource, the polyline resolution has to target a correct representation of segments on turn-by-turn navigation maps. In summarized route resource the resolution has to target the high level representation of the route on top of roads maps. Polyline example: 45.12345 7.009876, 45.12355 7.09866, . . .) |
| linkName | xsd:string | Yes | Name of the road that the segment belongs to |
| distance | xsd:float | Yes | Length of the segment in km |
| regularTravellingTime | xsd:float | Yes | Estimated regular time to drive through the segment in low traffic conditions, expressed in minutes |
| performanceParameters | PerformanceParameters [0 . . . unbounded] | Yes | This field contains performance parameters related to each segment. When segment structure is used to report network performance parameters for an area, a sequence of performanceParameters structure is included in the segment structure, providing information for the requested time interval and time resolution. |
| positionUpdate | xsd:boolean | Yes | If present and set to True, the application is requested to upload its current position when the Navigation Device enters this segment. |

4) Subscription List Structure

TABLE 4

| Element | Type | Optional | Description |
|---|---|---|---|
| subscription | Subscription [0 . . . unbounded] | Yes | It may contain an array of Subscription. |
| resourceURL | xsd:anyURI | Yes | Self referring URL. The resourceURL SHALL NOT be included in POST requests by the client, but MUST be included in POST requests representing notifications by the server to the client, when a complete representation of the resource is embedded in the notification. The resourceURL MUST be also included in responses to any HTTP method that returns an entity body, and in PUT requests. |

5) Subscription structure

TABLE 5

| Element | Type | Optional | Description |
|---|---|---|---|
| callbackReference | common:CallbackReference | No | Client's Notification endpoint and parameters. |
| link | common:Link [1 . . . unbounded] | No | References to resources subscribed by the application. Attribute "rel" indicates the type of resource subscribed. It may assume the following values: "Trip": in order to get notified about: new traffic events and performance parameter related to the set of routes defined for the trip new alternative route proposals "Area": in order to be notified of new traffic events and performance parameters updates Attribute "href" specifies the URL of |

TABLE 5-continued

| Element | Type | Optional | Description |
|---|---|---|---|
| | | | subscribed resource. Subscribed resource's type must be the same of that specified in "rel" attribute, Note: notified information for an existing route are: a) new traffic events provided with links included in the route resource itself; b) performance parameters available in updated performanceParameter filed of segment structures.) |
| trackingProc | xsd:boolean | Yes | If present and set to True, the application communicate to the server user's availability to provide position information through an external location application. |
| deviceLocationURI | xsd:anyURI | Yes | This parameter is used by the server for accessing Navigation Device position information. |
| tracking3rdParty | xsd:boolean | Yes | If present and set to True, the DynNav server tracks the $3^{rd}$ party position and notifies the availability of updated information when the $3^{rd}$ party position is changed. |
| resourceURL | xsd:anyURI | Yes | Self referring URL. The resourceURL SHALL NOT be included in POST requests by the client, but MUST be included in POST requests representing notifications by the server to the client, when a complete representation of the resource is embedded in the notification. The resourceURL MUST be also included in responses to any HTTP method that returns an entity body, and in PUT requests. |

FIG. 2 is a diagram illustrating a signal flow for an operation of a lightweight ND in a conventional DynNav system. Because the lightweight ND does not support route calculation in view of its capability, the lightweight ND should request route information to a server and receive the route information from the server. The lightweight ND has the following main functionality.

The lightweight ND transmits trip information to the server, for use in route calculation at the server.

The lightweight ND receives information about a set of routes (including a recommended route) calculated by the server from the server.

The lightweight ND subscribes to a notification service to receive real-time traffic information from the server.

A description will now be given with reference to the flow diagram of FIG. 2.

1. A user of an application defines journey parameters and the application transmits the parameters to a server. The server calculates a set of proposed routes based on the received parameters using related traffic information. The server sends a created "trip" resource including the route identifiers of the proposed routes to the application as a response.

2. The application accesses the set of routes of a summarized format. This step is repeated with respect to all the routes proposed by the server. However, when the length and complexity of the trip are restricted or network quality is inappropriate, full format route information may be used in this step. The application may request shape information (a polyline of a WGS84 coordinate system) of the proposed routes unavailable in a navigation device.

3. The user selects one of the set of proposed routes and the application accesses the full format information of the route selected by the user. The application may request shape information (a polyline of a WGS84 coordinate system) of the proposed routes unavailable in a navigation device. When the full format route is acquired in step 2, this step is not required. The server sends the selected route information along with the related traffic information as a response.

4. The application accesses traffic events related to the route using links to provided traffic event resources. Access to the traffic events may be restricted to categories selected by the user.

5. The application removes unnecessary routes which were previously proposed by the server but were not selected by the user.

6. The application requests the server to create subscription to a notification service for the trip (route(s)). The server notifies the application of the following events.

a. update of performance parameters of all routes related to the trip and new traffic events (for the selected categories)

b. proposal of alternative routes due to traffic problems of routes to be used c. route to an updated destination and/or a third party when the destination of the trip is the position of the third party and the position of the third party is changed. For notification of this information, the application should request a procedure of tracking the position of the third party from the server upon subscription to the notification service.

7. When a vehicle (including the application) escapes from the used route and makes a detour, the application modifies an origin parameter of the trip resource. The server recognizes that the current position of the vehicle is not on the used route and calculates a new route using a new origin. The server sends an identifier of the new route as a response and removes the previous route (and the identifier thereof). When the modified origin parameter corresponds to the previous route, the server uses this information in order to delete an already passed segment from the route.

Step 7 is performed when the vehicle makes a detour or escapes from the route, when the vehicle moves from a previously reported point by a specific distance and/or when the vehicle enters a segment in which the server requests upload of the current position of the vehicle.

8. The server delivers the notification resource to the application using links to the modified resources including the trip and the route including the updated traffic information (traffic events and performance parameters).

8. The application accesses the newly proposed route along with the performance parameters and the traffic events. Since the application subscribes to the notification service for the trip resource, the subscription includes the newly proposed route.

9. When the server detects the traffic events on the proposed routes, severe traffic congestion and/or change of the position of the third party, the server sends notification using a uniform resource locator (URL) of the updated information.

10. The application accesses the update information of the used route, new traffic events and the proposed alternative routes. Since the subscription to the notification service includes all routes related to the trip, the notification extends to the proposed alternative route. When the position of the third party is changed, the application accesses the changed position of the third party and/or the updated route resource as a destination.

In the meantime, during the lightweight ND service, it is often necessary for the user to request a path (or route) including one or more waypoints. For example, in order to provide more various services regarding a navigation service as well as to improve user satisfaction or user experience, a method for requesting a path (or route) including one or more waypoints and providing the requested path through the server is needed. For example, the user must visit various geographical locations within a predetermined time, such that the user can input various waypoints when requesting the path.

In addition, the above-mentioned method for requesting or providing a path (or route) including one or more waypoints must consider some important matters because the path (or route) includes one or more waypoints. The present invention proposes a method for providing a path (or route) including at least one waypoint and a solution for addressing some issues associated with the method.

DISCLOSURE

Technical Problem

An object of the present invention is to provide a method for addressing issues encountered in services for providing a path (or route) including one or more waypoints.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The objects of the present invention can be achieved by providing a method for receiving a route of a trip having a plurality of waypoints calculated by a server, the method being performed by a terminal, comprising: transmitting a request for the route of the trip having the plurality of waypoints to the server, wherein the request includes an indicator indicating that the route of the trip having the plurality of waypoints is requested, and information about the plurality of waypoints; receiving information regarding a proposed route of the trip having the plurality of waypoints from the server; and if the information regarding the proposed route includes information indicating the number of sub-routes included in the proposed route and a link regarding a first sub-route from among the sub-routes, receiving information regarding the first sub-route through the link regarding the first sub-route; and wherein the information regarding the first sub-route includes an indicator indicating whether or not a second sub-route subsequent to the first sub-route exists, and a link regarding the second sub-route.

Preferably, the method may further include receiving information regarding an N-th sub-route through a link regarding the N-th sub-route (where N>2).

Preferably, the information regarding the N-th sub-route includes an indicator indicating whether or not an (N+1)-th sub-route exists and a link regarding the (N+1)-th sub-route; and the link regarding the (N+1)-th sub-route is included in the N-th sub-route information when the (N+1)-th sub-route exists.

Preferably, the request includes a route condition including at least one of a maximum time allowed to travel the route, priority of each waypoint, or a staying time of each waypoint; and the proposed route is calculated based on the route condition.

Preferably, if a traveling consumption time of a specific proposed route calculated by the server exceeds the maximum time, at least one of the plurality of waypoints is excluded from the specific proposed route according to the priority.

Preferably, the proposed route may be divided into a plurality of sub-routes based on a traveling consumption time or a traveling distance.

Preferably, the individual sub-routes may be respectively based on road traffic information at different time instances.

Preferably, the individual sub-routes may be sequentially received at intervals of a predetermined time.

In accordance with another aspect of the present invention, a method for transmitting a route of a trip having a plurality of waypoints calculated by a server to a terminal, the method being performed by the server, comprising: receiving a request for the route of the trip having the plurality of waypoints from the terminal, wherein the request includes information indicating that the route of the trip having the plurality of waypoints is requested, and information regarding the plurality of waypoints; and calculating a proposed route of the trip including the plurality of waypoints; and transmitting information regarding the proposed route to the terminal, wherein if information regarding the proposed route includes information indicating the number of sub-routes included in the proposed route and a link regarding a first sub-route from among the sub-routes, the terminal is configured to receive information regarding the first sub-route through the link regarding the first sub-route; and the information regarding the first sub-route includes an indicator indicating whether or not a second sub-route subsequent to the first sub-route exists, and a link regarding the second sub-route.

Preferably, the information regarding an N-th sub-route may be provided to the terminal through a link regarding the N-th sub-route (where N>2).

Preferably, the information regarding the N-th sub-route includes an indicator indicating whether or not an (N+1)-th sub-route exists and a link regarding the (N+1)-th sub-route;

and the link regarding the (N+1)-th sub-route is included in the N-th sub-route information when the (N+1)-th sub-route exists.

Preferably, the request includes a route condition including at least one of a maximum time allowed to travel the route, priority of each waypoint, and a staying time of each waypoint; and the proposed route is calculated based on the route condition.

Preferably, if a traveling consumption time of a specific proposed route calculated by the server exceeds the maximum time, at least one of the plurality of waypoints may be excluded from the specific proposed route according to the priority.

Preferably, the proposed route may be divided into a plurality of sub-routes based on a traveling consumption time or a traveling distance.

Preferably, the individual sub-routes may be respectively based on road traffic information at different time instances.

Preferably, the individual sub-routes may be sequentially provided at intervals of a predetermined time.

In accordance with another aspect of the present invention, a terminal for receiving a route of a trip having a plurality of waypoints calculated by a server, comprising: a transceiver configured to communicate with the server; and a processor configured to acquire update information regarding the route based on information received from the server, wherein the processor transmits a request for the route of the trip having the plurality of waypoints to the server, the request including information indicating that the route having the plurality of waypoints is requested, and information about the plurality of waypoints, receives information regarding a proposed route of the trip having the plurality of waypoints from the server, and if the information regarding the proposed trip route includes information indicating the number of sub-routes included in the proposed route and a link regarding a first sub-route from among the sub-routes, receives information regarding the first sub-route through the link regarding the first sub-route, and wherein the information regarding the first sub-route includes an indicator indicating whether or not a second sub-route subsequent to the first sub-route exists, and a link regarding the second sub-route.

In accordance with another aspect of the present invention, a server for transmitting a route of a trip having a plurality of waypoints calculated by a server to a terminal, comprising: a transceiver configured to communicate with the server; and a processor configured to acquire update information regarding the route on the basis of information received from the terminal, wherein the processor receives a request for the route of the trip having the plurality of waypoints from the terminal, the request including information indicating that the route of the trip having the plurality of waypoints is requested, and information regarding the plurality of waypoints, and transmits information regarding the proposed route to the terminal, wherein if information regarding the proposed route includes information indicating the number of sub-routes included in the proposed route and a link regarding a first sub-route from among the sub-routes, the terminal is configured to receive information regarding the first sub-route through the link regarding the first sub-route; and the information regarding the first sub-route includes an indicator indicating whether or not a second sub-route subsequent to the first sub-route exists, and a link regarding the second sub-route.

It is to be understood that both the foregoing general description and the following detailed description of the present invention are exemplary and explanatory and are intended to provide further explanation of the invention as claimed.

Advantageous Effects

According to exemplary embodiments of the present invention, the present invention can reduce unnecessary data transmission and delivery between the navigation device (or application) and the server, such that it can improve Quality of Service (QoS) and/or Quality of Experience (QoE).

DESCRIPTION OF DRAWINGS

The accompanying drawings, which are included to provide a further understanding of the invention, illustrate embodiments of the invention and together with the description serve to explain the principle of the invention.

BEST MODE

Figure 1:
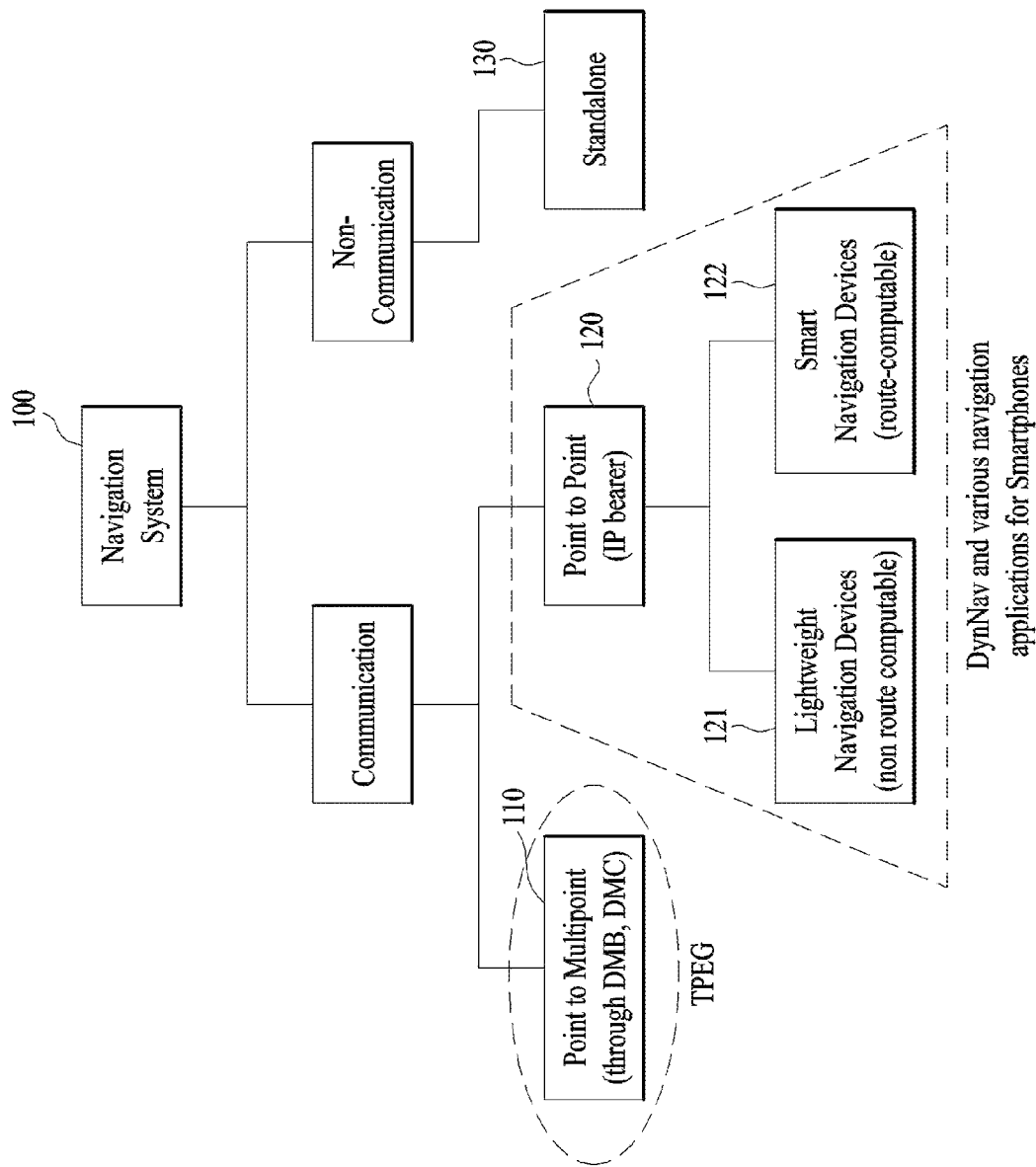
FIG. 1 is a block diagram illustrating a navigation device.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the invention. The same reference numbers will be used throughout this specification to refer to the same or like parts.

Terms used herein will be defined as follows.

Application

An application is an implementation of a well-defined but not standardized set of functions that perform work on behalf of a user. The application may include software and/or hardware elements and associated user interfaces.

Server

In general, a server is an entity that provides resources to clients in response to requests in the technical field of the present invention.

Client

In general, a client is a device, user agent, or other entity that acts as a receiver of a service in the technical field of the present invention.

DynNav Application

A DynNav application is an entity that is in charge of interacting with a DynNav server to get optimal route(s), real-time and forecasted traffic information, and complementary data. Therefore, the DynNav application is loaded in a terminal such as a smartphone, a mobile phone, an ND, etc. Accordingly, the term DynNav application is interchangeably used with terminal. In this aspect, the DynNav application is a kind of client. In this description, the DynNav application is referred to as a source terminal or a target terminal, or a terminal. The source terminal is referred to a terminal requesting a target terminal location based-route setting service and the target terminal is referred to an entity corresponding to destination in the service.

DynNav Server

A DynNav is an entity that is in charge of providing optimal route(s), real-time and forecasted traffic information, and complementary data to the application. In this aspect, the DynNav server is a kind of server.

Location URI

A location Uniform Resource Identifier (URI) is a URI that enables the current location of a device to be obtained from a particular location server using a particular dereferencing protocol.

Navigation Device (ND)

An ND is an entity that assists a driver, showing a correct route using a Global Navigation Satellite System (GNSS) service to reach a final destination. This entity may process real-time and predicted traffic information and dynamically estimates the optimal route, according to user preferences.

Lightweight ND

A lightweight ND is a navigation device that does not have a route calculation function, requests a calculated route to a server, and receives information about the calculated route from the server. The lightweight ND accesses the server for route estimation functionalities and for retrieving roads shape representation, if not available in a local map database.

Smart ND

A smart ND is a navigation device that is able to calculate a route(s), using a road network database available on the device itself.

Point Of Interest (POI)

A POI describes information about locations such as name, category, unique identifier, or civic address.

Segment

A segment is a unit into which a road is divided. For a general road, a road running between intersections is a segment, whereas for a highway, a road is divided into segments according to a policy for the highway. Traffic congestion or a passing time may be determined on a segment basis. In the specification, the term segment is interchangeably used with a road section.

Segment Sequence

A set consisting of one or more consecutive segments. If necessary, the segment sequence consisting of one segment is available. Also, an end point of the first segment of the segment sequence consisting of two or more segments is equal to a start point of the second segment of the segment sequence.

Polyline

A polyline is a continuous line used in graphic computing composed of one or more line segments, defined by specifying the endpoints of each segment.

Route Information

Route information is information about segment end points and complementary data from a defined origin and a destination.

Traffic Information

Traffic information is information including traffic events and network performance parameters related to an area or a route. Further, the traffic information may include current or upcoming, that is, future traffic information.

Traffic Event

A traffic event is information about events related to an area or a route that are either imposed or planned by a road network operator (i.e., road works leading to lane closures) or events that occur outside the control of the road network operator (i.e., accidents).

Network Performance Parameter

A network performance parameter is information regarding the performance (i.e., speed, delay, and travel time) of road segments related to an area or a route).

Route Information in Full Format

Route information in a full format is a type of route information including information about all segments from a origin to a destination. Unless specified otherwise, route information is about a whole route.

Route Information in Summarized Format

Route information in a summarized format is a kind of route information including only information about segments selected for a summary of information from among all segments of a route between an origin and a destination (how segments are to be selected is beyond the scope of the present invention).

Recently, as smartphones have come into widespread use, a navigation service for providing a movement route to a mobile communication terminal has been generalized in addition to use of an existing digital multimedia broadcasting (DMB) network. In the OMA Location Working Group (LOC WG), the above-described service is referred to as dynamic navigation (DynNav).

In the present specification, a navigation device refers to a device capable of performing a route guidance function and includes portable devices such as smartphones, mobile phones, mobile devices, laptops, tablet PCs or smart pads or all electronic devices capable of being attached to portable objects.

Figure 3:
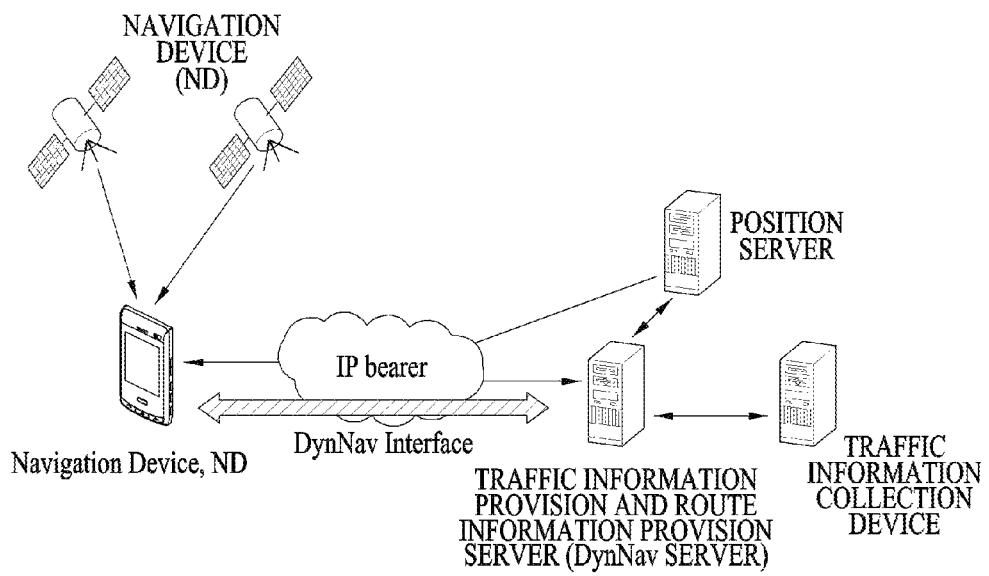
FIG. 3 is a conceptual diagram illustrating a network for explaining overall configuration of an IP based DynNav system acting as a navigation system according to an embodiment of the present invention.

FIG. 3 illustrates a network configuration referred to for describing an Internet Protocol (IP)-based DynNav system being a navigation system according to the present invention. As illustrated in FIG. 3, the navigation system according to the present invention may include an ND that may be connected to a mobile communication network, a mobile communication network for wireless transmission and reception, a traffic information collector and a traffic information and route information providing server (i.e. a DynNav server), which provide traffic information, and a location server for generating and providing assistance data to locate an ND.

For simplicity of description, the traffic information and route information providing server or the DynNav server is referred to shortly as the "server". The navigation device is referred to shortly as the ND. According to the capability of an ND, the ND is referred to as the "smart ND" or "lightweight ND".

In the present invention, a terminal (two terminal types are available, as described before) may be connected to a mobile communication network or an IP network such as a Wireless Fidelity (Wi-Fi) network as illustrated in the figure. A corresponding application may access the server, receive route guidance data and real-time traffic information, and thus provide route guidance. While not shown, a terminal capable of calculating a route on its own may selectively receive only real-time traffic information without receiving route guidance data from the server.

The real-time traffic information refers to optimal route information calculated and transmitted to the terminal by the server, real-time and forecasted traffic information, and additional information related to traffic, such as POI and weather. To avoid representational redundancy, a navigation application or a terminal is collectively referred to as a terminal. Accordingly, the terms "terminal", "smart ND", "lightweight ND", and "navigation application" may be referred to uniformly as "terminal".

Figure 4:
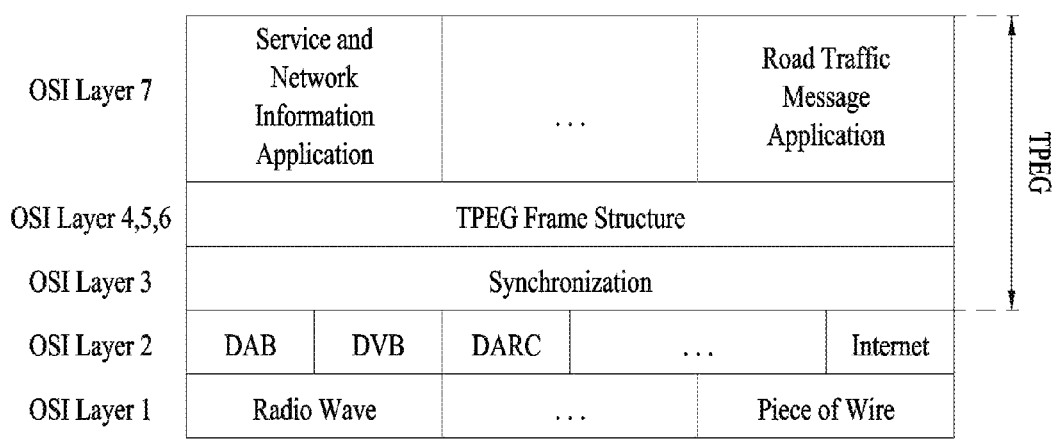
FIG. 4 is a TPEG layer structure.

The afore-mentioned real-time traffic information may be represented in Transport Protocol Experts Group (TPEG) under consideration in the ISO standardization organization. TPEG is a standard protocol used to transmit traffic information and travel information over a digital broadcasting network. As illustrated in FIG. 4, a TPEG layer stack corresponds to the network layer (Layer 3; L3) to application layer (Layer 7; L7) of the ISO/OSI layer model. The network layer defines TPEG frame synchronization and routing. The packetization layer of Layers 4, 5, 6 (L4, L5, and L6) combines components of applications into one stream. Each message format corresponds to the application layer, L7. In DynNav, real-time traffic information may be provided to a terminal in a real-time traffic information representation scheme of TPEG or any other representation scheme.

Generally, when the user requests a route from the server, various information, for example, an origin (i.e., a departure), a destination, a waypoint, a start time, etc., may be applied to the server. The server may construct an optimum route to be supplied to the user on the basis of not only the user requested information (e.g., origin, destination, waypoint, start time, etc.) but also real-time or forecasted road traffic information, such that it can transmit the optimum route to the user. In this case, the user must provide the origin and the destination to the server.

In accordance with the method of the embodiment of the present invention, when the user requests a route from the server, at least one waypoint is used, such that an optimum route passing through the at least one waypoint can be requested. In this case, the server may generate the order of passing through respective waypoints and an optimum route for passing through the corresponding waypoint in consideration of real-time or forecasted road traffic information. In this case, if the user does not select a specific destination, the server may select a route by considering one of several waypoints as a destination. As an example for requesting and providing a route, services for a parcel deliveryman or salesman who must visit many places or spots may be used.

In this example, although the deliveryman or salesman must pass through a plurality of waypoints, the deliveryman or salesman need not always designate a final destination such that the route to the destination need not be requested. In this example, it may be difficult to provide a route using the legacy method (in which the origin and the destination are always designated when a route is requested).

In the meantime, the shortest route passing through several waypoints need not always be an optimum route due to traffic situations. Therefore, a method for providing an optimum route passing through several waypoints according to traffic situations is needed. In this case, the order of passing through several waypoints may be changed according to traffic situations. In addition, the traffic situations may change over time, such that a method for efficiently providing a route needs to be considered.

The present invention proposes a method for allowing a user to request a route having at least one waypoint, and providing an optimum route through the server. In addition, the present invention also proposes a method for reducing the number of updates in which route and traffic information should be updated according to change in traffic conditions.

FIRST EXAMPLE

Method for Requesting and Providing a Route Having One or More Waypoints

A method for providing an optimum route having two or more waypoints to a user includes: allowing the user to request a route from a server; and providing a route to the user through the server. The present invention does not describe a method for allowing the server to calculate an optimum route upon receiving a request from the user. A method for calculating an optimum route can be implemented through various algorithms.

1-1. Route Request

When the user requests a route from the server in the conventional DynNav, basic information needed for route construction is contained in the user request (See Table 1). In this case, an origin (originWGS84 or originAddress) and a destination (destinationWGS84 or destinationAddress) must be contained in the user request.

Conditions for allowing a user to request an optimum route having a plurality of waypoints from the server are as follows.

When a route is requested, two or more waypoints are included.

When a route is requested, destination information may or may not be included (when destination information is not included, one of the requested waypoints is considered to be a destination, such that a route is generated.)

When a route is requested, an indicator (routeForMultipleWaypoints) requesting an optimum route including a plurality of waypoints may be included.

The indicator for requesting an optimum route including the plurality of waypoints will hereinafter be described in detail. "routeForMultipleWaypoints" parameter may be defined as a sub-parameter of a "Trip" parameter used when the user requests a route from the server.

TABLE 6

| Element | Type | Option | Description |
| --- | --- | --- | --- |
| routeForMultipleWaypoints | Xsd:boolean | Yes | This parameter may indicate that the user requests an optimum route including a plurality of waypoints. If this parameter is True, two or more waypoints must be included. If this parameter is True, and if destination parameters (destinationWGS84, destinationAddress, and destination3rdParty) are not included, one of the plurality of waypoints may be considered to be a destination. |

The server having received a route from the user may confirm a "routeForMulitpleWaypoints" parameter, such that it can confirm that the user requests a route including a plurality of waypoints. The server may calculate an optimum route in consideration of an origin, a destination (in the case of including a destination), waypoints, and a traffic situation. In this case, the order of arriving at waypoints may be changed according to an optimum route. If the destination is not included, one of the plurality of waypoints may be considered to be a final destination in consideration of an optimum route.

Although a method for allowing the user to indicate a plurality of waypoints can be represented using a sub-parameter "waypoints" of the "Trip" parameter (See Table 1), the method may also be represented through a plurality of destinations (destinationWGS84 or destinationAddress) according to implementation examples.

In addition, when a route is requested, the user may add a time condition and a priority condition of a waypoint such that the user may request the route. First, a time condition may indicate a method for designating a total route travel time when the user requests the route. Parameters regarding the route travel time are as follows.

TABLE 7

| Element | Type | Optional | Description |
| --- | --- | --- | --- |
| requestedTravellingTime | Xsd:float | Yes | Travelling time of a planned trip |

If the user designates the route travel time, the server must provide a route through which the user can pass through all waypoints during the designated travel time. In this case, if the user does not designate a route start time, a current time may be considered to be the route start time.

The route start time may be used as a reference indicating whether a new substitute route (or a new alternative route) will be calculated and provided. Assuming that a traffic situation of the received route is deteriorated, a route travel time increases, and the increased route travel time does not exceed the above route travel time, the user can proceed along the corresponding route. If the increased travel time exceeds the route travel time due to a poor traffic situation, the server may calculate a new route that does not exceed the route travel time, and may provide the new route to the user.

In addition, when the user requests a route, the user may establish not only a time condition but also a waypoint priority condition. Parameters regarding the waypoint priority condition are as follows.

TABLE 8

| Element | Type | Optional | Description |
| --- | --- | --- | --- |
| priority Level | Xsd:integer [0 . . . unbounded] | Yes | This indicates priorities of respective waypoints. (This field represents the level of the priority for each waypoint. This parameter has to be considered if not all the points can be visited in requestedTravellingTime interval, waypoints with low priorityLevel (low value) have to be discarded when the route is calculated.) |

When the user requests a route including a plurality of waypoints from the server and the user request includes the above time condition and priority condition, the server may calculate an optimum route appropriate for a predetermined condition, and may provide the route. If it is possible to pass through all the waypoints requested by the user within a predetermined time, the server may not consider the priority condition when an optimum route is generated. However, if it is possible to pass through all the waypoints requested by the user within the predetermined time, the server may generate an optimum route by primarily considering the high-priority waypoint on the basis of a waypoint priority condition, and may generate an optimum route without including a low-priority waypoint in the optimum route such that the server can be adjusted according to the time condition.

1-2. Path Provision

A scheme for providing a route to the user through the server can be classified into two methods. The first method may control the server to simultaneously provide all routes to the user. The second method may control the server to divide a route into a plurality of sub-routes and provide the sub-routes to the user.

The first method is identical to a conventional method. If the user requests the route from the server, the server may simultaneously provide the entire route from a calculated optimum origin to the destination to the user. In addition, if traffic information is changed or an alternative route occurs during a navigation service, the user is notified of the changed or generated information in the same manner as in the conventional method, such that the user can recognize the corresponding information.

If a route becomes increased in length or a travel time becomes longer, there is a high probability that traffic information will be changed or an alternative route will occur and such change or alternative route occurrence may frequently occur. Specifically, a movement distance or travel time of a vehicle including a parcel deliveryman or salesman who must visit many places or locations is generally very long, such that such change or modification information may frequently occur. As a result, the first method has a high probability that the server must frequently re-provide the changed information to the user, such that a large amount of network resources are consumed. In order to address this issue, the second method, which divides the entire route into sub-routes and thus provides the sub-routes to the user, is proposed.

If the entire route is long in length or the travel time is long, the server may divide the route into sub-routes according to a predetermined reference, and may thus provide the sub-routes to the user. In this case, the following references may be considered and used.

Waypoint reference considering travel distance
(For example, a waypoint unit movable for 10 km)
Waypoint reference considering travel time
(For example, a waypoint unit movable for 1 hour)

Figure 5:
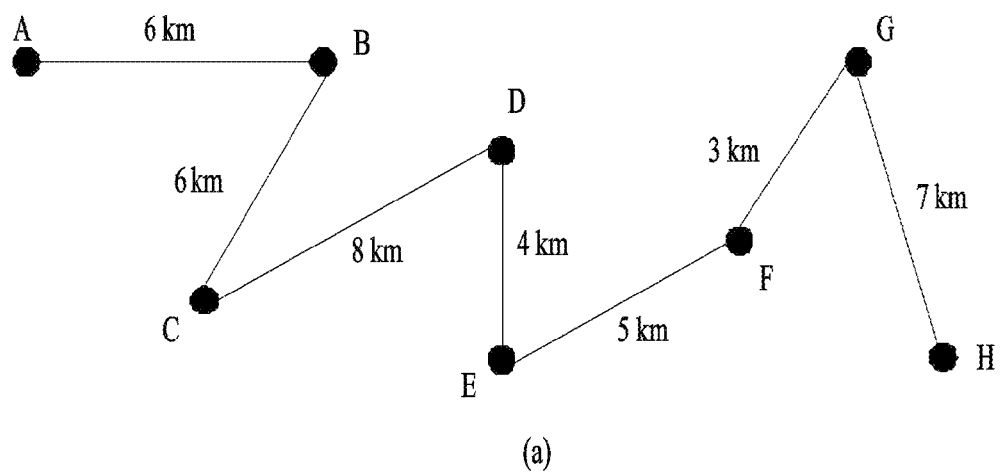
FIG. 5 exemplarily illustrates a route (or path) having a plurality of waypoints according to an embodiment of the present invention.
Figure 5:
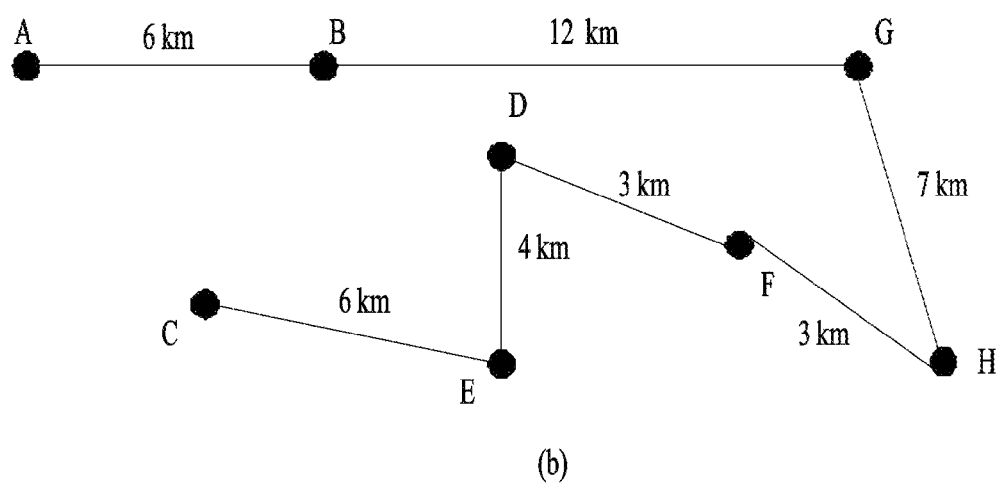
Figure 5:
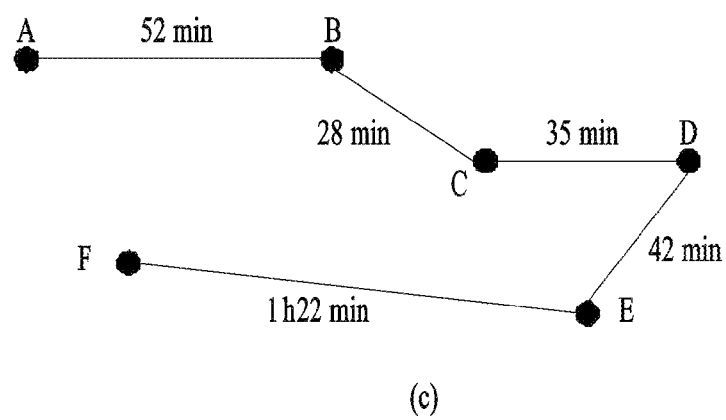

FIG. 5 exemplarily illustrates a route having a plurality of waypoints according to an embodiment of the present invention. In FIG. 5(a), the user may request a route in which one waypoint (A) is set to an origin and waypoints (B~H) are contained in the requested route, and the server may calculate the following optimum route. Assuming that the server stepwise transmits the route on the basis of waypoints in which the server considers the travel distance, and the reference travel distance is 10 km, the server may transmit a route to the user by applying the following steps to the following routes. Routes corresponding to respective steps will hereinafter be referred to as sub-routes, for example, a first-step route, a second-step route, and a third-step route.

First step route: A~C (12 km)
Second step route: C~E (12 km)
Third step route: E~H (15 km)

Although the server calculates another route when the same origin and the same waypoints are used, different provision methods may be used as shown in FIG. 5(b).

First step route: A~G (18 km)
Second step route: G~F (10 km)
Third step route: F~C (13 km)

Although the same origin and the same waypoints are used as shown in FIGS. 5(a) and 5(b), another optimum route may be provided to the user. In addition, although the reference travel distance is set to 10 km in the above example, a route passing through each waypoint is not divided into 10 km, such that the route is divided into a distance having an approximate value of about 10 km.

FIG. 5(c) shows a route including a plurality of waypoints on the basis of the travel time. The user requests a route in which one waypoint (A) is used as an origin and waypoints (B~F) are contained in the requested route, and the server may calculate an optimum route as shown in FIG. 5(c). Assuming that the server stepwise transmits a route on the basis of waypoints considering the travel time and the reference travel time is 1 hour, the server may transmit a necessary route to the user by applying the following steps to the following routes.

First step route: A~C (1 hour and 20 minutes)
Second step route: C~E (1 hour and 17 minutes)
Third step route: E~F (1 hour and 22 minutes)

As can be seen from the above examples, since the reference travel time is 1 hour and the travel time of a route passing through each waypoint is not divided into 1 hour, the route can be divided into sub-routes, each of which has a distance having an approximate value of about 1 hour.

As described above, the server may divide the calculated optimum route into sub-routes according to a reference, and may provide the sub-routes to the user. In this case, two methods may be used as necessary. The first method may control the server to simultaneously provide the sub-routes to the user. In accordance with the second method, if one route is terminated, the server provides the next-step route.

In the first method, the server can simultaneously transmit the sub-routes to the user. In more detail, after the server calculates an optimum path according to the user request and divides the optimum route, the server can provide addresses capable of receiving the sub-routes to the user. For example, if the optimum route is composed of 5 sub-routes, the server may provide 5 addresses capable of receiving the 5 sub-routes to the user. The user having received the 5 addresses may simultaneously access respective addresses, such that the user may simultaneously receive the sub-routes. Alternatively, prior to completion of one sub-route, the user may access an address capable of receiving the next sub-route, such that the user can receive a desired route.

In the second method, the server may provide the next sub-route to the user after completion of one sub-route. After the server calculates an optimum route and divides the optimum route according to a user request, the server may provide the next sub-route to the user before completion of one sub-route. If the optimum route is divided into 5 sub-routes, the server may provide a first sub-route to the user. When the first sub-route is provided to the user, the server may transmit not only the sub-route but also an indicator indicating the presence of additional sub-routes to the user. The user may confirm the presence of additional sub-routes through the indicator. The user may request a second sub-route from among the first sub-route proceeding, and may receive the second sub-route. Even when the second sub-route is provided, the server may further transmit the indicator for indicating the presence of additional sub-routes to the user. In this way, the user may receive the subsequent sub-routes. When the user receives the last sub-route of the optimum route, the server may indicate not only an indicator for indicating the absence of a route to be received but also the last position of an optimum route.

Additional parameters needed for the above-mentioned route provision method are as follows.

When various optimum routes are provided to the user, a first parameter from among the additional parameters may indicate the number of optimum routes to be provided from the server to the user, namely, the first parameter may indicate the number of sub-routes.

TABLE 9

| Element | Type | Optional | Description |
|---|---|---|---|
| numberOfSubroutes | xsd:integer | Yes | This element may indicate how many routes are supplied to the user. If this parameter is included, the user must access a link of each route and must receive the corresponding route. (In case that the DynNav application requests the route to visit multiple waypoints and the DynNav server decides to provide the route in the form of subroutes, this parameter includes the number of subroutes provided.) |

Therefore, when the server provides initial trip information to the user (i.e., UE), information regarding the initial sub-route must be supplied to the user (UE). This initial sub-route information may be provided through the following parameters.

TABLE 10

| Element | Type | Optional | Description |
|---|---|---|---|
| link | Common: Link [0 ... unbounded] | Yes | Link to reference route resource. There are two different kinds of reference route resources. 1) Reference to routes for which the route is related to the trip. In this case, attribute "rel" must be set to "Route". 2) Reference to the first sub-route of the route related to the trip in case that the DynNav application requests the route to visit multiple waypoints and the DynNav server provides the sub-route. In this case, attribute "rel" must be set to "Subroute". |

The second parameter is a parameter for providing a link through which a current user (UE) can receive not only an indicator for indicating the presence of an additional route as well as a current user route but also the corresponding route. When route information regarding the defined trip is supplied to the user after the trip is defined, the second parameter may be provided.

TABLE 11

| Element | Type | Optional | Description |
|---|---|---|---|
| additionalSubroute | xsd:boolean | Yes | After this route, the indicator for indicating the presence of an additional route subsequent to this route may be designated. (In other words, the presence or absence of an additional sub-route after lapse of a current sub-route can be indicated) (In case that the DynNav application requests the route to visit multiple waypoints and the DynNav server provides the subroute, this parameter indicates that a subsequent subroute to be provided exists. If the value is set to true a subsequent subroute to be provided exists.) |
| Link | common:Link | Yes | Link to reference route resource. There are three different kinds of reference route resources. 1) Reference to the route for which it is proposed as alternative. Attribute "rel" must be set to "Route". 2) Reference to the route for which the partial route information is referred. Attribute "rel" must be set to "ReferenceRoute". 3) Reference to the next sub-route to be provided in case that the DynNav application requests the route to visit multiple waypoints and the DynNav server provides the sub-route. Attribute "rel" must be set to "Subroute". |

In the above-mentioned description, when an optimum route is divided into a plurality of sub-routes, it is assumed that an origin and a destination of each sub-route are used as waypoints. However, the origin and the destination of each sub-route need not always be set to waypoints. The origin and the destination of each sub-route may not be waypoints, and may be arbitrary positions designated by the server.

Second Example

Method for Reducing the Number of Traffic and Route Information Updates

A scheme for reducing the number of traffic and route information updates according to another embodiment of the present invention will hereinafter be described in detail. If there is a waypoint while the user (or UE) travels, the user may arrive at the waypoint and conduct other tasks at the waypoint, and then perform re-starting at the waypoint. For example, a parcel deliveryman or salesman who must visit many locations may arrive at each waypoint and conduct the corresponding task at the waypoint, and may then perform re-starting at the waypoint. However, the conventional navigation service does not consider time consumption after the user arrives at the waypoint, such that there is no movement regarding the route during the time consumed at the waypoint, and road traffic information used in the optimum route calculation may be different from that in the actual movement. In other words, traffic information change associated with the user route may occur in the time consumed at the above waypoint, such that the optimum route calculation may not actually be optimal. The above-mentioned problems will hereinafter be described with reference to FIG. 6.

Figure 6:
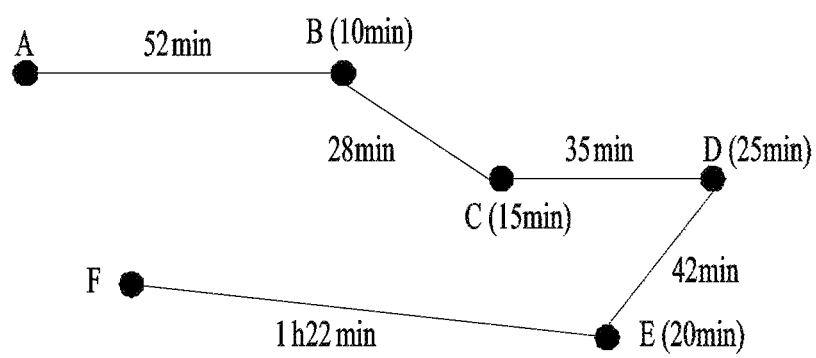
FIG. 6 exemplarily illustrates a route (or path) having a plurality of waypoints in consideration of a staying time of each waypoint according to an embodiment of the present invention.

FIG. 6 illustrates an optimum route in which a holding time at each waypoint is reflected according to an embodiment of the present invention. The route shown in FIG. 6 may use the A waypoint as the origin, and may pass through a plurality of waypoints (B, C, D, E, F), such that travel times among respective waypoints and a stay time at each waypoint are shown in FIG. 6. In the conventional navigation service, a total travel time is 239 minutes. In the case of considering a stay time of each waypoint, a total travel time is 309 minutes, such that a time difference of 70 minutes may occur between the two total travel times (239 minutes and 309 minutes). When the server calculates the route, assuming that a travel route is long in length, road traffic information to be applied to route calculation may be changed according to an update period of road traffic information. When the server calculates the route, real-time road traffic information and forecasted road traffic information may be applied according to the travel time based on a route length. For example, if the server may generate forecasted road traffic information in units of one hour, and if the travel time of the requested route is 2 hours or greater, real-time traffic information is applied to a route to be travelled during the first one hour, and forecasted traffic information is applied to a route to be moved during the next one hour, such that the route can be calculated. If a stay time at each waypoint is not considered as shown in the above example, it is impossible to correctly calculate a total travel time, such that it is difficult to apply the appropriate real-time and forecasted road traffic information. Specifically, if a travel distance and a travel time are long and many waypoints are present, such an error unavoidably increases such that the number of modification notification times of road traffic information unavoidably increases.

As a result, the embodiment of the present invention can provide a stay time of each waypoint when the user requests an optimum route including a plurality of waypoints from the server. The proposed parameters are as follows.

TABLE 12

| Element | Type | Optional | Description |
| --- | --- | --- | --- |
| waypointStayingTime | Xsd:float [0 . . . unbounded] | Yes | This field represents a list of the staying time of each waypoint. If present, the staying time of each waypoint MUST be considered when the route and the ending time are calculated. |

As a result, the server can more correctly forecast (or estimate) the travel time during calculation of the optimum route as compared to the conventional art. In addition, the route can be more efficiently calculated using the real-time road traffic information and the forecasted road traffic information, such that the number of road traffic information changes (updates) can be reduced.

Third Example

Method for Transmitting Route Based on Delivery of the Order of Waypoints

Another method for providing an optimum route passing through a plurality of waypoints to the user according to another embodiment of the present invention will hereinafter be described in detail.

The user may request an optimum route having a plurality of waypoints from the server, and may provide the server with information regarding various waypoints through which the user will pass. In this case, information regarding waypoints may be transmitted without consideration of the order of passing through the waypoints. The server may consider a plurality of waypoints to be an optimum route on the basis of the current and forecasted road traffic information, and may provide the user with the order of passing through the plurality of waypoints.

A detailed description thereof will hereinafter be given with reference to FIG. 7.

Figure 7:
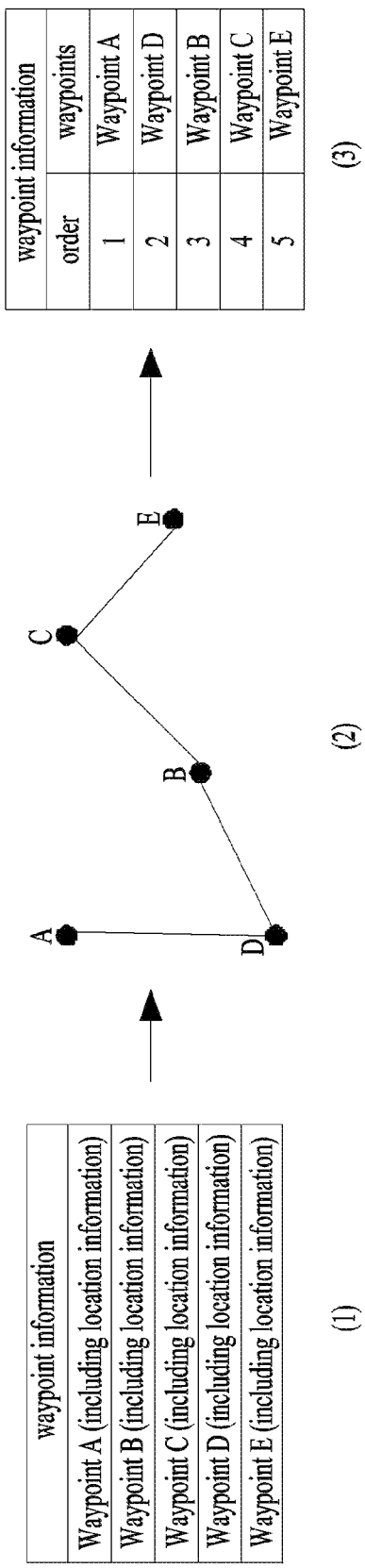
FIG. 7 is a conceptual diagram illustrating a method for providing sub-waypoint information according to an embodiment of the present invention.

(1) In FIG. 7(1), the user may transmit information regarding the plurality of waypoints to the server, and at the same time may request an optimum route including the plurality of waypoints from the server. In this case, the waypoint information may be transmitted without consideration of the order of passing through the waypoints.

(2) In FIG. 7(2), the server having received a request may calculate an optimum route including a plurality of waypoints in consideration of the current and forecasted road traffic information, such that it can determine the order of passing through the plurality of waypoints.

(3) In FIG. 7(3), the server may provide the user with information regarding the order of passing through waypoints on the basis of the calculation result of FIG. 7(2).

The user having received information regarding the order of passing through waypoints may request route information or road traffic information needed when arriving at respective waypoints from the server according to the above-mentioned order information. For example, the user may request a waypoint traffic information request of the smart ND and/or a waypoint route information request of the lightweight ND from the server. For instance, upon receiving the order of waypoints as shown in FIG. 7(3), the user may initially request a route (or traffic information) from the origin to the A point. Thereafter, the user may request a route from the A point to the D point. In this way, the user may request the route to the E point, and may receive the requested route. The above-mentioned scheme for requesting and receiving the route may be identical to that of the conventional DynNav service.

Briefly, according to this embodiment of the present invention, if the user requests a route including a plurality of waypoints, the server may designate the order of passing through the waypoints and may indicate the designated order. Based on this indication result, the user may request the route from one waypoint to the next waypoint from the server and may receive the requested route.

The embodiment of the present invention will hereinafter be described with reference to FIG. 2.

The embodiment of FIG. 2 relates to a scenario for allowing the DynNav application (hereinafter referred to as a UE) to request delivery of the route information from the DynNav server (hereinafter referred to as a server). The principal functions of the above scenario may include the following functions 1, 2, 3, 4(a), 4(b), and 4(c). The function (1) may indicate delivery of a summarized route and/or a total route. The function (2) may indicate subscription to a notification service. The function (3) may indicate reporting of a current position by the UE. The function 4(a) may indicate serious traffic jam (or congestion) on the proposed route. The function 4(b) may indicate a detour from a route to be used. The function 4(c) may indicate route re-calculation when a destination is a third party and the position of the third party is changed.

The user of the UE may define a trip on the basis of an origin, a destination, and other preferences. These parameters may be immediately transmitted to the server by the UE. The destination may be defined using an ID of the third party. In this case, the server may acquire the position of the third party through the external position application (server), and the position of the third party may be used as the destination. The server will generate one set of routes matched to the trip parameters in consideration of the real-time and forecasted road traffic information. For bandwidth optimization, the routes may be classified into two different formats (i.e., summarized and total routes) such that the routes can be used in the server. The above UE may access the summarized route, and may select one path from among the proposed set to be used for navigation using this information. The route to be delivered to the third party may be selected from among the proposed paths. The UE may request a total route regarding the selected route, and may also delete unused routes. Due to the limited length, trip complexity, and network performance, the proposed routes may be immediately encoded from the beginning. In this case, the server need not encode the summarized route. If it is impossible to use this data for the above UE within the road database (DB), the above UE may request information regarding a segment shape (WGS84 coordinate polygon) of routes from the server.

In order for the UE to update traffic information (e.g., performance parameter and traffic event) regarding the route to be used, and in order for the UE to receive an alternative route proposal when traffic jam (or congestion) occurs on the route, an ID of the third party may be used as a destination. If the position of the third party is changed, the UE may join in notification services for receiving updated information (updated destination, additional segment, or alternative route). The UE will update its own current position to the server after a vehicle (equipped with the UE) travels a predetermined distance. By means of this information, the server will delete tripped segments from the route to be used (if the tripped segments are not deleted by the UE in advance), such that routes incompatible with the current position will be deleted.

Thereafter, the user may make a detour from the use route. Under this condition, the UE may update its own updated current position, and the server may recognize that the current position of the UE cannot be compatible with the use route such that the server may estimate a new route on the basis of the updated position information. The new route ID may be transmitted to the above UE during the current position update procedure (the notification procedure regarding the new route is no longer required). In order to minimize the number of interactions with the UE for safety reasons, the above notification service will be automatically extended to new proposed route(s).

Due to traffic jam (congestion) on the proposed route, the server may inform the user of the updated traffic information regarding the use route and the alternative route of the use route, and the UE may access resources known resources. If the above information is not deleted, the server will automatically provide the notification service for the new proposed route.

If the ID of the third party is used as the destination, the destination may be changed or modified because the third party can move from a current place to another place. In this case, the server may inform the UE of the updated information. The updated information types may be classified into updated destination (1), additional segment (2), and alternative route (3). In order to reduce the number of interactions, the server may indicate the updated information only when the UE is located in the vicinity of the destination according to the updated information types.

If the UE requests the route so as to visit a plurality of waypoints, the server may divide the estimated route (calculated route) into some sub-routes in such a manner that the server can efficiently manage and update the route information. In this case, since the server can sequentially provide the sub-routes, the UE may retrieve sub-routes to be sequentially used.

Figure 2:
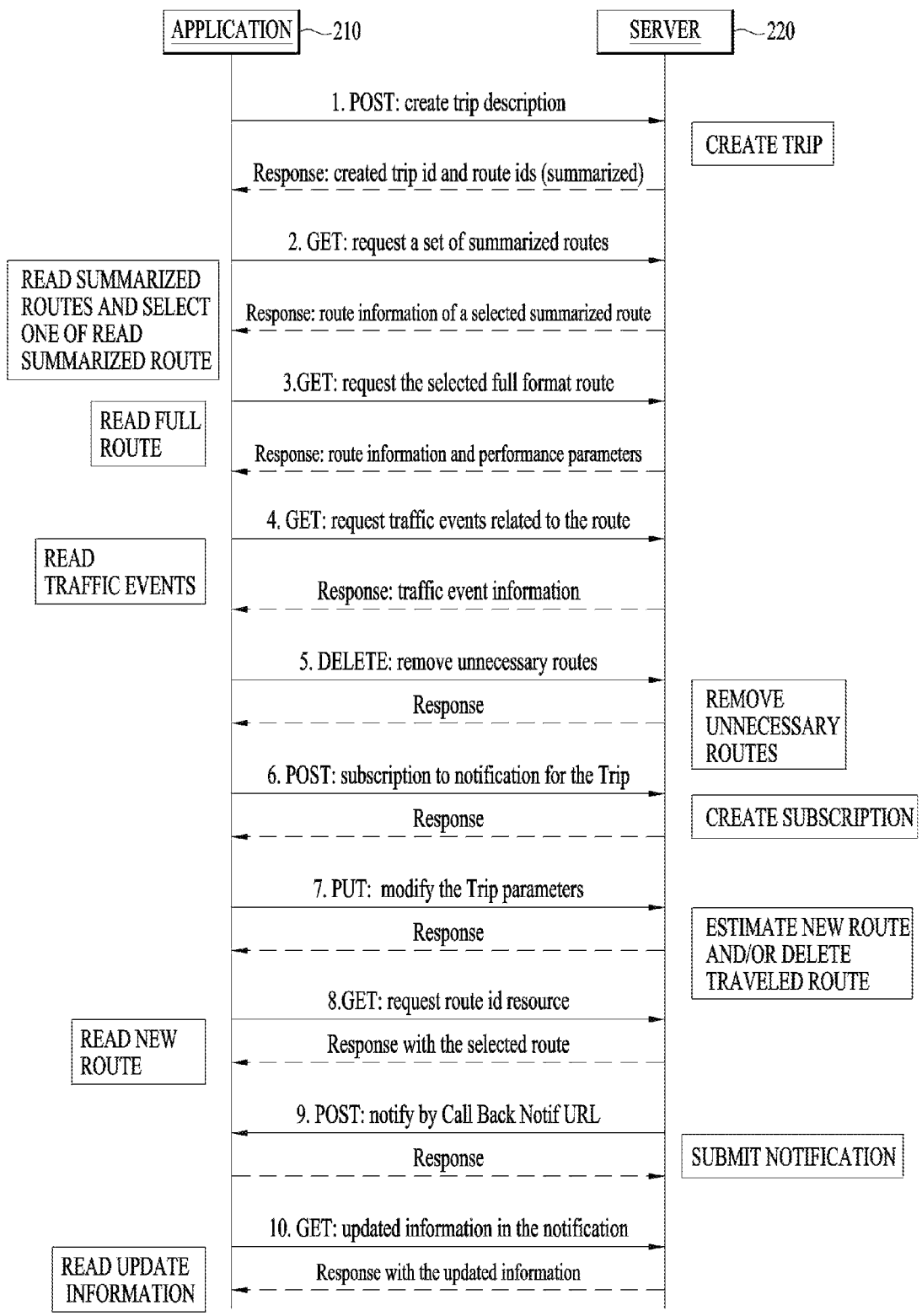
FIG. 2 is a flowchart illustrating operations of a lightweight ND for use in a conventional DynNav system.

In accordance with the scenario in which the route including several waypoints is requested and an associated optimum route is provided, addition or modification items may occur in the steps (1) and (3) of FIG. 2.

In step (1) of FIG. 2, the user (UE) may generate parameters regarding a desired trip (i.e., a trip composed of an origin, a destination, waypoint(s), etc.). In addition, in order to request the trip route including the above waypoint(s), an indicator (routeForMultipleWaypoints) for indicating that the route including the waypoints is requested must be added. In this case, information regarding at least two waypoints must be added.

In addition, the user (UE) may further include a restriction condition regarding the requested route. For example, a maximum time (requestedTravellingTime) allowed when the user moves on the route may be added. For instance, assuming that a maximum of 4 hours (240 minutes) is allowed when the user visits all the waypoints (A~E) from the origin (generally, the current UE position), the user may add 4 hours to the condition when the route is requested.

If only the estimated route exceeding the above maximum time is needed when the UE visits all waypoints on the basis of the current/forecasted road traffic information, at least one of the waypoints can be removed from the estimated route according to priority information. The priority information may indicate priorities of individual waypoints, and the priorities may be entered by the UE, such that the waypoints may be sequentially removed in ascending numerical order as necessary.

In addition, the stay time during which the user stays at each waypoint may be established when the above route is requested, and this stay time request must be considered in route calculation by the server.

Therefore, when the route including a plurality of waypoints is requested by the user, the server may divide the proposed route into a plurality of sub-routes. If provision of several sub-routes is decided as described above, the server may inform the user of the number of sub-routes contained in the proposed route. In addition, the reference route resource regarding the first partial route of the proposed route may be supplied to the user.

In step (3) of FIG. 2, the user may select one of the proposed summarized routes, and may request or access the entire route associated with the selected route. If the user requests the route including the plurality of waypoints from the server, and if the server divides the route into a plurality of sub-routes, the user or UE may access the above sub-route information instead of the entire route.

Upon receiving the above sub-routes, the user may receive not only information regarding the first sub-route from the server, but also an indicator for indicating the presence or absence of a subsequent sub-route. If the subsequent sub-route is present, the user may receive route information including information of a reference (link) regarding the subsequent sub-route (i.e., the second sub-route).

If the above sub-route(s) are supplied by the server, the step (3) of FIG. 2 may be repeated to access the subsequent sub-route before a previous user arrives at a destination of the underway sub-route. In addition, the step (3) of FIG. 2 may be repeated until specific information indicating that there is no more additional sub-routes is indicated.

Figure 8:
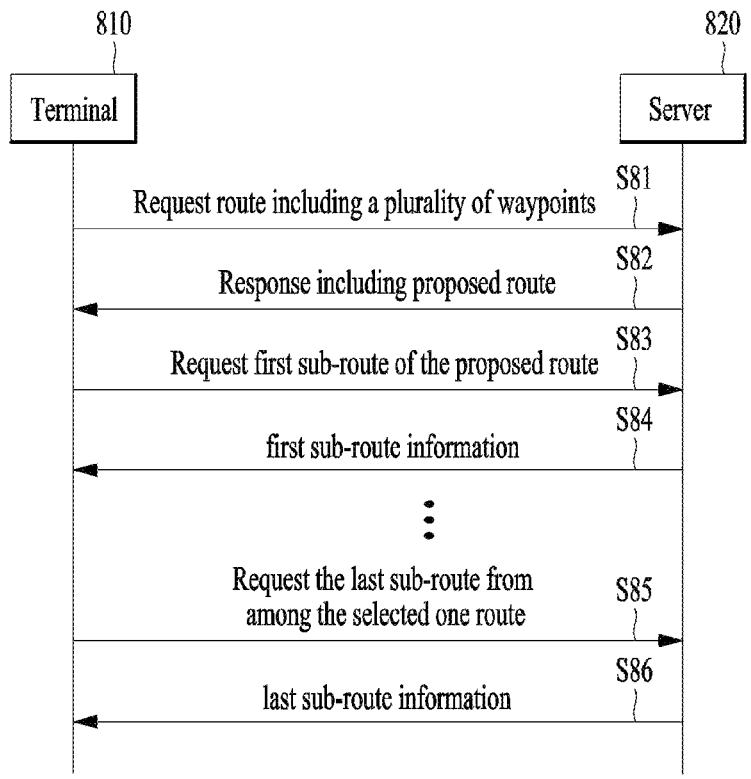
FIG. 8 exemplarily illustrates operations of the embodiment of the present invention.

FIG. 8 exemplarily illustrates operations of the embodiment of the present invention.

Referring to FIG. 8, the UE 810 may refer to a user, user equipment, or one of applications contained in the user equipment. The server 820 may refer to a server, a server device, or one of applications contained in the server device. However, the scope or spirit of the present invention is not limited thereto, and the UE 810 may refer to other terms.

The UE may request the route including a plurality of waypoints from the server in step S81. The above request must include an origin and a plurality of waypoints, and the destination need not always be designated. If the destination is not designated, one of the waypoints may be designated as the destination. In addition, when the route including the plurality of waypoints is requested, the indicator indicating that the route including the plurality of waypoints is requested must be contained in the above request. In this case, two or more waypoints must be contained in the above request.

In addition, when the above request is transmitted, the UE may add the additional restriction condition to this request. For example, a maximum time to be consumed to travel the above route may be established. In association with the above-mentioned description, priority information of respective waypoints may be established. After the forecasted holding time needed for route traveling is calculated by the server, if the forecasted consumption holding time exceeds the maximum time, at least one waypoint may be deleted from the calculated route according to the aforementioned priority information.

In addition, the stay time during which the UE will stay at each waypoint may be established. Generally, if the route including a plurality of waypoints is requested, there is a high possibility that the UE will stay at each waypoint during a specific time, and it may be necessary to update the current/forecasted road traffic information by the specific time, such that a method for establishing the stay time of each waypoint may be needed to more correctly estimate the route.

Therefore, the server may calculate the proposed route according to the request of the step S81, and may transmit a response including the proposed route information to the UE in step S82.

At least one of the parameters shown in Tables 8, 9 and 12 may be entered by the UE (or user) when the UE (or user) requests the trip route including a plurality of waypoints, and the server may calculate the proposed route on the basis of the entered parameters.

The above response may include not only specific information indicating the number of sub-routes contained in the proposed route, but also a reference link regarding the first sub-route. The UE may access the reference link, such that the UE may request the first sub-route in step S83.

The UE may acquire information regarding the first sub-route from the server in step S84. The above information may include a reference link regarding the first sub-route and a reference link regarding the second sub-route (i.e., in the case in which the second sub-route is present).

If a subsequent sub-route is present, the UE may acquire a specific sub-route from the server through the reference link, and may also acquire a reference link regarding the subsequent sub-route. This acquisition may be repeated until there are no more subsequent sub-routes.

As described above, several sub-routes may be sequentially transmitted and/or received at intervals of a predetermined time. Therefore, the current/forecasted road traffic information used to calculate each sub-route may be road traffic information of different times. That is, the current/forecasted road traffic information may be updated at different times.

Figure 9:
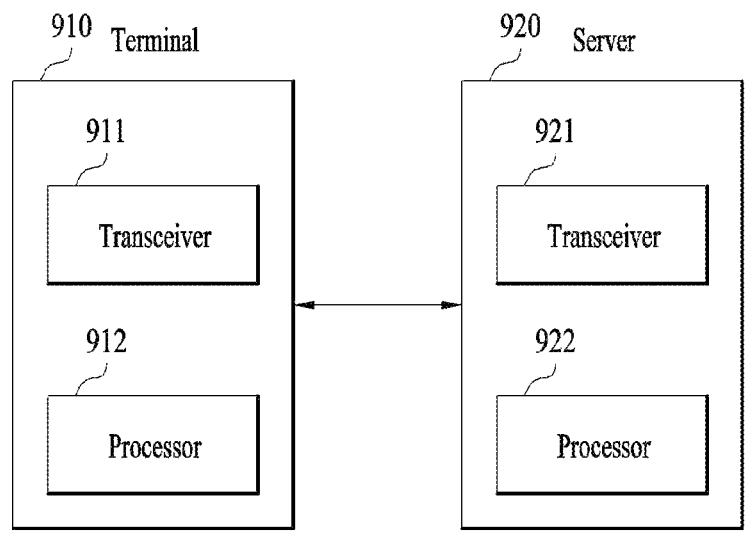
FIG. 9 is a block diagram of an apparatus for implementing embodiment(s) of the present invention.

FIG. 9 is a block diagram illustrating a UE and a server configured to implement the embodiments of the present invention. Referring to FIG. 9, the UE 910 may include a transceiver 911 configured to communicate with the server 920; and a processor 912 configured to acquire update information of the route on the basis of information received from the server. The server 920 may include a transceiver 921 configured to communicate with the UE; and a processor 922 configured to generate update information regarding the route on the basis of information received from the UE.

The embodiment to be described with reference to FIG. 9 may indicate that the UE 910 is the lightweight ND. In this embodiment, the UE 910 may be configured to receive the trip route including a plurality of waypoints calculated by the server. In this embodiment, the origin of the route is the UE position, and the destination may be separately designated or may be set to one of the plurality of waypoints. In this embodiment, the processor 912 may be configured to transmit, to the server, a request for the trip route including the plurality of waypoints. This request may include not only information indicating that the route including the plurality of waypoints is requested, but also information regarding the plurality of waypoints. In addition, the processor 912 may be configured to receive information regarding the proposed route of the trip including the plurality of waypoints from the server.

Since the proposed trip route is composed of a plurality of sub-routes, if information regarding the proposed route includes not only specific information indicating how many sub-routes are contained in the proposed trip route but also a link regarding the first sub-route from the sub-routes, the processor 912 may be configured to receive information regarding the first sub-route through a link of the first sub-route. In addition, information regarding the first sub-route may include not only an indicator indicating the presence or absence of a second sub-route subsequent to the first sub-route, but also a link regarding the second sub-route.

The processor 912 may be configured to receive information regarding the N-th sub-route through the link of the N-th sub-route (where N is an integer of 2 or greater).

In addition, the N-th sub-route information may include not only an indicator indicating the presence or absence of the (N+1)-th sub-route, but also a link regarding the (N+1)-th sub-route. The link regarding the (N+1)-th sub-route may be contained in the N-th sub-route information when the (N+1)-th sub-route is present.

The processor 912 may be configured in a manner that the above request includes a route condition composed of at least one of a maximum allowed travel time of the route, priority of each waypoint, and a stay time of each waypoint. Preferably, the maximum allowed travel time and the priority for each waypoint may be simultaneously contained in the request. If the travel consumption time of a specific proposed route calculated by the server exceeds the maximum allowed travel time, at least one of the plurality of waypoints may be excluded from the specific proposed route according to the above priority information.

The proposed route may be divided into a plurality of sub-routes on the basis of either the travel holding time or the travel distance. Each sub-route may be calculated on the basis of road traffic information of different times. In addition, the processor 912 may be configured to receive respective sub-routes at intervals of a predetermined time.

The content associated with the processor 922 of the server may refer to at least one of the above-mentioned embodiments.

The methods according to the embodiment(s) of the present invention may request route information for allowing the UE to visit a plurality of waypoints from the server. In this case, the travel distance of the route or the travel time of the route may be considerably long. If the long route is provided and used without change, managing and updating the above route information may be considered inefficient or may use much more resources. In this case, the server may divide the above long route into some short sub-routes (i.e., sub or divided routes), and may sequentially provide the short sub-routes, such that the route information can be efficiently managed and updated. Since individual sub-routes are sequentially applied to the UE, the server may internally update route information not yet supplied to the UE according to the changed traffic condition. Therefore, consumption of network resources will be reduced in amount.

After the server calculates or estimates the route associated with the requested trip, if the travel distance of the route or the travel time of the route exceeds a specific threshold value, the server may divide the estimated route into some sub-routes. When the server generates the sub-routes, the original (overall) route may be divided into sub-routes at intervals of a predetermined travel distance (e.g., 20 km) or at intervals of a predetermined travel time (e.g., two hours).

After the sub-routes are generated, the server may provide the first sub-route information to the UE through the trip-associated information. Thereafter, the UE may access the first sub-route information. A link of the second sub-route may be contained in the first sub-route information. Before arriving at the destination of the first sub-route, the UE may access the second sub-route information including a link of the third sub-route. The UE may repeatedly perform the above procedure to access the subsequent sub-route until an indication message indicating that no more additional sub-routes are present is received (i.e., until the "additionalSub-route" parameter contained in the route resource has a false value).

The present invention proposes a method for requesting and providing a route having a plurality of waypoints although the user does not designate the destination. In addition, the present invention proposes a route provision method and a method for reducing the number of notification times associated with change of an alternative route and traffic information on the basis of a stay time of each waypoint.

Various navigation services can be provided through the methods proposed by the present invention. In addition, network resources used by the UE can be reduced by the method for reducing the number of notification times of the alternative route and traffic information change.

The user equipment (UE) or the server may be configured as a combination of one or more embodiments of the present invention, or may be configured as a combination of some combinations of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The embodiments of the present invention can be applied to a navigation device or a server.

The invention claimed is:

1. A method for receiving a route of a trip having a plurality of waypoints calculated by a server, the method being performed by a terminal, comprising:
   transmitting a request for the route of the trip having the plurality of waypoints to the server, wherein the request includes an indicator indicating that the route of the trip having the plurality of waypoints is requested, and information about the plurality of waypoints; receiving information regarding a proposed route of the trip having the plurality of waypoints from the server; and
if the information regarding the proposed route includes information indicating the number of sub-routes included in the proposed route and a link regarding a first sub-route from among the sub-routes, receiving information regarding the first sub-route through the link regarding the first sub-route; and
wherein the information regarding the first sub-route includes an indicator indicating whether or not a second sub-route subsequent to the first sub-route exists, and a link regarding the second sub-route.

2. The method according to claim 1, further comprising:
receiving information regarding an N-th sub-route through a link regarding the N-th sub-route (where N>2).

3. The method according to claim 2, wherein:
the information regarding the N-th sub-route includes an indicator indicating whether or not an (N+1)-th sub-route exists and a link regarding the (N+1)-th sub-route; and
the link regarding the (N+1)-th sub-route is included in the N-th sub-route information when the (N+1)-th sub-route exists.

4. The method according to claim 1, wherein:
the request includes a route condition including at least one of a maximum time allowed to travel the route, priority of each waypoint, or a staying time of each waypoint; and
the proposed route is calculated based on the route condition.

5. The method according to claim 4, wherein:
if a traveling consumption time of a specific proposed route calculated by the server exceeds the maximum time, at least one of the plurality of waypoints is excluded from the specific proposed route according to the priority.

6. The method according to claim 1, wherein the proposed route is divided into a plurality of sub-routes based on a traveling consumption time or a traveling distance.

7. The method according to claim 1, wherein the sub-routes are respectively based on road traffic information at different time instances.

8. The method according to claim 1, wherein the sub-routes are sequentially received at intervals of a predetermined time.

9. A method for transmitting a route of a trip having a plurality of waypoints calculated by a server to a terminal, the method being performed by the server, comprising:
receiving a request for the route of the trip having the plurality of waypoints from the terminal, wherein the request includes information indicating that the route of the trip having the plurality of waypoints is requested, and information regarding the plurality of waypoints; and
calculating a proposed route of the trip including the plurality of waypoints; and
transmitting information regarding the proposed route to the terminal,
wherein if information regarding the proposed route includes information indicating the number of sub-routes included in the proposed route and a link regarding a first sub-route from among the sub-routes, the terminal is configured to receive information regarding the first sub-route through the link regarding the first sub-route; and
the information regarding the first sub-route includes an indicator indicating whether or not a second sub-route subsequent to the first sub-route exists, and a link regarding the second sub-route.

10. The method according to claim 9, wherein:
information regarding an N-th sub-route is provided to the terminal through a link regarding the N-th sub-route (where N>2).

11. The method according to claim 10, wherein:
the information regarding the N-th sub-route includes an indicator indicating whether or not an (N+1)-th sub-route exists and a link regarding the (N+1)-th sub-route; and
the link regarding the (N+1)-th sub-route is included in the N-th sub-route information when the (N+1)-th sub-route exists.

12. The method according to claim 9, wherein:
the request includes a route condition including at least one of a maximum time allowed to travel the route, priority of each waypoint, and a staying time of each waypoint; and
the proposed route is calculated based on the route condition.

13. The method according to claim 12, wherein:
if a traveling consumption time of a specific proposed route calculated by the server exceeds the maximum time, at least one of the plurality of waypoints is excluded from the specific proposed route according to the priority.

14. The method according to claim 9, wherein the proposed route is divided into a plurality of sub-routes based on a traveling consumption time or a traveling distance.

15. The method according to claim 9, wherein the sub-routes are respectively based on road traffic information at different time instances.

16. The method according to claim 9, wherein the sub-routes are sequentially provided at intervals of a predetermined time.

17. A terminal for receiving a route of a trip having a plurality of waypoints calculated by a server, comprising:
a transceiver configured to communicate with the server; and
a processor configured to acquire update information regarding the route based on information received from the server,
wherein the processor transmits a request for the route of the trip having the plurality of waypoints to the server, the request including information indicating that the route having the plurality of waypoints is requested, and information about the plurality of waypoints, receives information regarding a proposed route of the trip having the plurality of waypoints from the server, and if the information regarding the proposed trip route includes information indicating the number of sub-routes included in the proposed route and a link regarding a first sub-route from among the sub-routes, receives information regarding the first sub-route through the link regarding the first sub-route, and
wherein the information regarding the first sub-route includes an indicator indicating whether or not a second sub-route subsequent to the first sub-route exists, and a link regarding the second sub-route.

18. A server for transmitting a route of a trip having a plurality of waypoints calculated by a server to a terminal, comprising:
- a transceiver configured to communicate with the server; and
- a processor configured to acquire update information regarding the route on the basis of information received from the terminal,
- wherein the processor receives a request for the route of the trip having the plurality of waypoints from the terminal, the request including information indicating that the route of the trip having the plurality of waypoints is requested, and information regarding the plurality of waypoints, and transmits information regarding the proposed route to the terminal,
  - wherein if information regarding the proposed route includes information indicating the number of sub-routes included in the proposed route and a link regarding a first sub-route from among the sub-routes, the terminal is configured to receive information regarding the first sub-route through the link regarding the first sub-route; and
  - the information regarding the first sub-route includes an indicator indicating whether or not a second sub-route subsequent to the first sub-route exists, and a link regarding the second sub-route.

* * * * *